United States Patent

Fischer et al.

[11] Patent Number: 6,022,935
[45] Date of Patent: *Feb. 8, 2000

[54] PREPARATION OF POLYMERS OF ALK-1-ENES IN THE PRESENCE OF A SUPPORTED METALLOCENE CATALYST SYSTEM AND OF ANTISTATIC AGENT

[75] Inventors: David Fischer, Gönnheim; Helmut Frank, Böhl-Iggelheim; Martin Lux, Dannstadt-Schauernheim; Roland Hingmann, Ladenburg; Günther Schweier, Friedelsheim, all of Germany

[73] Assignee: BASF Aktiengesellschaft, Ludwigshafen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/839,811

[22] Filed: Apr. 18, 1997

[30] Foreign Application Priority Data

Apr. 22, 1996 [DE] Germany .................. 196 15 953

[51] Int. Cl.$^7$ ............... C08F 4/68; C08F 4/642; C08F 10/06
[52] U.S. Cl. ............ 526/129; 526/74; 526/127; 526/132; 526/151; 526/152; 526/153; 526/160; 526/348; 526/351; 526/901; 526/902
[58] Field of Search ............... 526/74, 160, 901, 526/902, 127, 129, 132, 151, 152, 153

[56] References Cited

U.S. PATENT DOCUMENTS

| | | | |
|---|---|---|---|
| 4,794,096 | 12/1988 | Ewen . | |
| 5,283,278 | 2/1994 | Daire et al. | 526/904 |
| 5,371,260 | 12/1994 | Sangokoya . | |
| 5,391,793 | 2/1995 | Marks et al. . | |
| 5,459,217 | 10/1995 | Todo et al. | 526/348.1 |
| 5,529,965 | 6/1996 | Chang | 526/124.2 |
| 5,552,358 | 9/1996 | Speca | 526/141 |
| 5,654,248 | 8/1997 | Kioka et al. | 526/160 |

FOREIGN PATENT DOCUMENTS

| | | |
|---|---|---|
| 107 127 | 5/1984 | European Pat. Off. . |
| 294 942 | 12/1988 | European Pat. Off. . |
| 535 230 | 4/1993 | European Pat. Off. . |
| 621 279 | 10/1994 | European Pat. Off. . |
| 633 264 | 1/1995 | European Pat. Off. . |
| 636 636 | 2/1995 | European Pat. Off. . |
| 679 661 | 11/1995 | European Pat. Off. . |
| 745 607 | 12/1996 | European Pat. Off. . |
| 284 708 | 10/1998 | European Pat. Off. . |
| 91/09882 | 7/1991 | WIPO . |
| 94/26793 | 11/1994 | WIPO . |
| 95/32242 | 11/1995 | WIPO . |
| 96/08520 | 3/1996 | WIPO . |
| 96/11960 | 4/1996 | WIPO . |
| 96/32420 | 10/1996 | WIPO . |

OTHER PUBLICATIONS

Jrl. of Orgn. Chem. 369 (1989 359–370, Wiesenfeldt et al.

*Primary Examiner*—Fred Teskin
*Attorney, Agent, or Firm*—Keil & Weinkauf

[57] ABSTRACT

Polymers of $C_2$–$C_{12}$-alk-1-enes are prepared at from –50 to 300° C. and from 0.5 to 3000 bar in the presence of a catalyst system by a process in which the catalyst system used is one which contains A) an inorganic or organic carrier,
B) a metallocene complex,
C) a compound forming metallocenium ions and
D) if required, a metal compound of the general formula I $$M^1(R^1)_r(R^2)_s(R^3)_t \qquad \text{I}$$

where
$M^1$ is an alkali metal, an alkaline earth metal or a metal of main group III of the Periodic Table,
$R^1$ is hydrogen, $C_1$–$C_{10}$-alkyl, $C_6$–$C_{15}$-aryl, alkylaryl or arylalkyl, each having 1 to 10 carbon atoms in the alkyl radical and 6 to 20 carbon atoms in the aryl radical,
$R^2$ and $R^3$ are each hydrogen, halogen, $C_1$–$C_{10}$-alkyl, $C_6$–$C_{15}$-aryl, alkylaryl, arylalkyl or alkoxy, each having 1 to 10 carbon atoms in the alkyl radical and 6 to 20 carbon atoms in the aryl radical,
r is an integer from 1 to 3 and
s and t are integers from 0 to 2, the sum r+s+t corresponding to the valency of $M^1$,
and in which an antistatic agent is used.

6 Claims, No Drawings

PREPARATION OF POLYMERS OF ALK-1-ENES IN THE PRESENCE OF A SUPPORTED METALLOCENE CATALYST SYSTEM AND OF ANTISTATIC AGENT

Peparation of polymers of alk-1-enes in the presence of a supported metallocene catalyst system and of an antistatic agent.

The present invention relates to a process for the preparation of polymers of $C_2$–$C_{12}$-alk-1-enes at from −50 to 300° C. and from 0.5 to 3000 bar in the presence of a catalyst system.

The present invention furthermore relates to the use of the resulting polymers for the production of fibers, films and moldings and to the fibers, films and moldings obtainable therefrom.

Metallocene catalysts permit the preparation of novel polyolefins. Application on a carrier is usually required for commercial use of such metallocene catalysts in conventional industrial processes, since this gives polymers having improved morphology, as described in EP-A 294 942. However, the supported metallocene catalysts to date show a stronger tendency to form polymerization agglomerations or deposits than modern Ziegler-Natta support catalysts. Moreover, the productivity of the supported metallocene catalysts is still very low.

The use of antistatic agents as additives for reducing coatings in ethylene polymerization is described for the use of Ziegler or Phillips catalysts, for example in EP-A 636 636. By using Ziegler or Phillips catalysts, however, polymers having, for example, a broad molecular weight distribution are obtained. The addition of antistatic agents to Ziegler or Phillips catalysts does not lead to an improvement in the productivity of the catalyst.

It is an object of the present invention to provide processes for the preparation of polymers of $C_2$–$C_{12}$-alk-1-enes, which processes give polymers having a narrow molecular weight distribution and can be carried out on an industrial scale and in which no coatings and agglomerates are formed. In addition, the productivity of the catalyst systems used should be improved.

We have found that this object is achieved by processes for the preparation of polymers of $C_2$–$C_{12}$-alk-1-enes at from −50 to 300° C. and from 0.5 to 3000 bar in the presence of a catalyst system, wherein the catalyst system used is one which contains A) an inorganic or organic carrier,
B) a metallocene complex,
C) a compound forming metallocenium ions and
D) if required, a metal compound of the general formula I

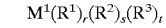

where
$M^1$ is an alkali metal, an alkaline earth metal or a metal of main group III of the Periodic Table,
$R^1$ is hydrogen, $C_1$–$C_{10}$-alkyl, $C_6$–$C_{15}$-aryl, alkylaryl or arylalkyl, each having 1 to 10 carbon atoms in the alkyl radical and 6 to 20 carbon atoms in the aryl radical,
$R^2$ and $R^3$ are each hydrogen, halogen, $C_1$–$C_{10}$-alkyl, $C_6$–$C_{15}$-aryl, alkylaryl, arylalkyl or alkoxy, each having 1 to 10 carbon atoms in the alkyl radical and 6 to 20 carbon atoms in the aryl radical,
r is an integer from 1 to 3 and
s and t are integers from 0 to 2, the sum r+s+t corresponding to the valency of $M^1$, and wherein an antistatic agent is used.

We have also found the use of the resulting polymers for the production of fibers, films and moldings as well as the fibers, films and moldings obtainable therefrom.

Among the $C_2$–$C_{12}$-alk-1-enes used in the novel process, ethylene, propene, but-1-ene, pent-1-ene, 4-methylpent-1-ene, hex-1-ene, hept-1-ene and oct-1-ene, and mixtures of these $C_2$–$C_{12}$-alk-1-enes are preferred. Homo- or copolymers of propene are particularly preferred, the amount of propene in the copolymers being at least 50 mol %. Preferred copolymers of propene are those which contain ethylene or but-1-ene or mixtures thereof as further monomers.

From 50 to 100 mol % of propene
from 0 to 50, in particular from 0 to 30, mol % of ethylene and
from 0 to 20, in particular from 0 to 10, mol % of $C_4$–$C_{12}$-alk-1-enes
are preferably used as alk-1-enes.

If copolymers of propene with ethylene are prepared, the amount of ethylene is preferably from 0.5 to 50 mol %.

The sum of the mol % is always 100.

The novel process is carried out at from −50 to 300° C., preferably from 0 to 150° C., and at from 0.5 to 3000, particularly from 1 to 80, bar.

The polymerization may be carried out in solution, in suspension, in liquid monomers or in the gas phase. The polymerization is preferably carried out in liquid monomers or in the gas phase, the stirred gas phase being preferred.

The process may be carried out either continuously or batchwise. Suitable reactors include continuously operated stirred kettles, it also being possible to use a number of stirred kettles connected in series (reactor cascade).

The catalyst system used in the novel process contains, as component A), an inorganic or organic carrier. Preferably used carriers are finely divided carriers which preferably have a particle diameter of from 1 to 300 μm, in particular from 30 to 70 μm. Examples of suitable inorganic carriers are magnesium chloride and silica gels, preferably those of the formula $SiO_2 \cdot a\, Al_2O_3$, where a is from 0 to 2, preferably from 0 to 0.5; these are therefore aluminosilicates or silica. Such products are commercially available, for example Silica Gel 332 from Grace. Examples of suitable organic carriers are finely divided polyolefins, for example finely divided polypropylene.

The amount of carrier is preferably from 50 to 99.9% by weight, based on metallocene complex (component B).

The catalyst system used in the novel process contains one or more metallocene complexes as component B). Particularly suitable metallocene complexes are those of the general formula IV

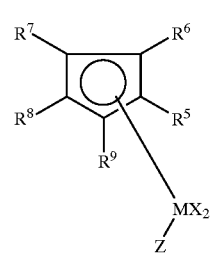

where
M is titanium, zirconium, hafnium, vanadium, niobium or tantalum

X is fluorine, chlorine, bromine, iodine, hydrogen, $C_1$–$C_{10}$-alkyl, $C_6$–$C_{15}$-aryl, alkylaryl having 1 to 10 carbon atoms in the alkyl radical and 6 to 20 carbon atoms in the aryl radical, —$OR^{10}$ or —$NR^{10}R^{11}$, $R^{10}$ and $R^{11}$ are each $C_1$–$C_{10}$-alkyl, $C_6$–$C_{15}$-aryl, alkylaryl, arylalkyl, fluoroalkyl or fluoroaryl, each having 1 to 10 carbon atoms in the alkyl radical and 6 to 20 carbon atoms in the aryl radical, $R^5$ to $R^9$ are each hydrogen, $C_1$–$C_{10}$-alkyl, 5- to 7-membered cycloalkyl, which in turn may carry $C_1$–$C_{10}$-alkyl as substituent, $C_6$–$C_{15}$-aryl or arylalkyl, where two adjacent radicals together may furthermore form a saturated or unsaturated cyclic group of 4 to 15 carbon atoms, or $Si(R^{12})_3$, $R^{12}$ is $C_1$–$C_{10}$-alkyl, $C_3$–$C_{10}$-cycloalkyl or $C_6$–$C_{15}$-aryl, Z is X or

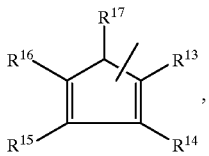

$R^{13}$ to $R^{17}$ are each hydrogen, $C_1$–$C_{10}$-alkyl, 5- to 7-membered cycloalkyl, which in turn may carry $C_1$–$C_{10}$-alkyl as a substituent, $C_6$–$C_{15}$-aryl or arylalkyl, where two adjacent radicals together may furthermore form a saturated or unsaturated cyclic group of 4 to 15 carbon atoms, or $Si(R^{18})_3$, $R^{18}$ is $C_1$–$C_{10}$-alkyl, $C_6$–$C_5$-aryl or $C_3$–$C_{10}$-cycloalkyl, or where $R^8$ and Z together form a group —$R^{19}$—A—,

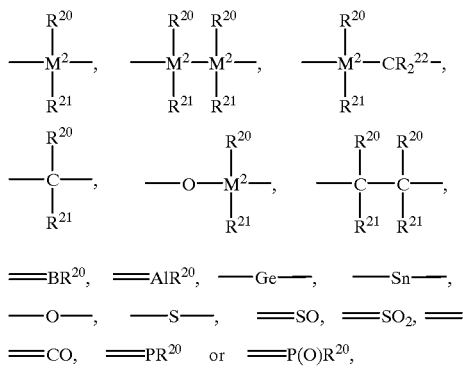

$R^{20}$, $R^{21}$ and $R^{22}$ are identical or different and are each hydrogen, halogen, $C_1$–$C_{10}$-alkyl, $C_1$–$C_{10}$-fluoroalkyl, $C_6$–$C_{10}$-fluoroaryl, $C_6$–$C_{10}$-aryl, $C_1$–$C_{10}$-alkoxy, $C_2$–$C_{10}$-alkenyl, $C_7$–$C_{40}$-arylalkyl, $C_8$–$C_{40}$-arylalkenyl or $C_7$–$C_{40}$-alkylaryl, or two adjacent radicals together with the atoms linking them form a ring, $M^2$ is silicon, germanium or tin,

A

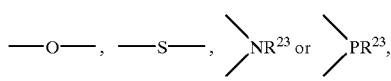

$R^{23}$ is $C_1$–$C_{10}$-alkyl, $C_6$–$C_{15}$-aryl, $C_3$–$C_{10}$-cycloalkyl, alkylaryl or $Si(R^{24})_3$, $R^{24}$ is hydrogen, $C_1$–$C_{10}$-alkyl, $C_6$–$C_{10}$-aryl, which in turn may be substituted by $C_1$–$C_4$-alkyl, or $C_3$–$C_{10}$-cycloalkyl or where $R^8$ and $R^{16}$ together form a group —$R^{19}$—.

Preferred metallocene complexes of the general formula IV are

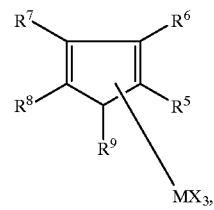

IVa

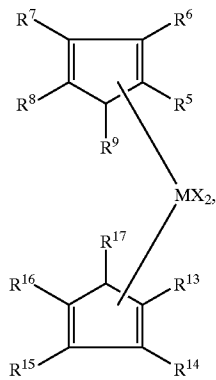

IVb

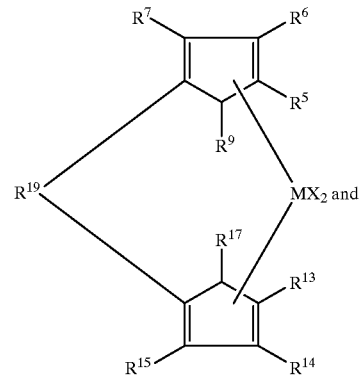

IVc

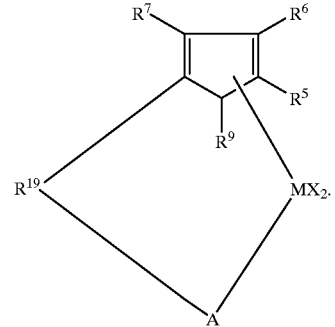

IVd

The radicals X may be identical or different but are preferably identical.

Particularly preferred compounds of the formula IVa are those in which

M is titanium, zirconium or hafnium,

X is chlorine, $C_1$–$C_4$-alkyl or phenyl and $R^5$ to $R^9$ are each hydrogen or $C_1$–$C_4$-alkyl.

Particularly preferred compounds of the formula IVb are those in which

M is titanium, zirconium or hafnium,

X is chlorine, $C_1$–$C_4$-alkyl or phenyl, $R^5$ to $R^9$ are each hydrogen, $C_1$–$C_4$-alkyl or $Si(R^{12})_3$, and $R^{13}$ to $R^{17}$ are each hydrogen, $C_1$–$C_4$-alkyl or $Si(R^{18})_3$.

Particularly suitable compounds of the formula IVb are those in which the cyclopentadienyl radicals are identical.

Examples of particularly suitable compounds include bis(cyclopentadienyl)zirconium dichloride,
bis(pentamethylcyclopentadienyl)zirconium dichloride,
bis(methylcyclopentadienyl)zirconium dichloride,
bis(ethylcyclopentadienyl)zirconium dichloride,
bis(n-butylcyclopentadienyl)zirconium dichloride and
bis(trimethylsilylcyclopentadienyl)zirconium dichloride and the corresponding dimethylzirconium compounds.

Particularly suitable compounds of the formula IVc are those in which $R^5$ and $R^{13}$ are identical and are each hydrogen or $C_1$–$C_{10}$-alkyl, $R^9$ and $R^{17}$ are identical and are each hydrogen, methyl, ethyl, iso-propyl or tert-butyl, $R^7$ and $R^{15}$ are each $C_1$–$C_4$-alkyl $R^6$ and $R^{14}$ are each hydrogen or two adjacent radicals $R^6$ and $R^7$ on the one hand and $R^{14}$ and $R^{15}$ on the other hand together form a cyclic group of 4 to 12 carbon atoms, $R^{19}$ is

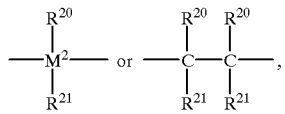

M is titanium, zirconium or hafnium and

X is chlorine, $C_1$–$C_4$-alkyl or phenyl.

Examples of particularly suitable complex compounds include dimethylsilanediylbis(cyclopentadienyl)zirconium dichloride,
dimethylsilanediylbis(indenyl)zirconium dichloride,
dimethylsilanediylbis(tetrahydroindenyl)zirconium dichloride,
ethylenebis(cyclopentadienyl)zirconium dichloride,
ethylenebis(indenyl)zirconium dichloride,
ethylenebis(tetrahydroindenyl)zirconium dichloride,
tetramethylethylene-9-fluoroenylcyclopentadienylzirconium dichloride,
dimethylsilanediylbis(3-tert-butyl-5-methylcyclopentadienyl)zirconium dichloride,
dimethylsilanediylbis(3-tert-butyl-5-ethylcyclopentadienyl)zirconium dichloride,
dimethylsilanediylbis(2-methylindenyl)zirconium dichloride,
dimethylsilanediylbis(2-isopropylindenyl)zirconium dichloride,
dimethylsilanediylbis(2-tert-butylindenyl)zirconium dichloride,
diethylsilanediylbis(2-methylindenyl)zirconium dibromide,
dimethylsilanediylbis(3-methyl-5-methylcyclopentadienyl)zirconium dichloride,
dimethylsilanediylbis(3-ethyl-5-isopropylcyclopentadienyl)zirconium dichloride,
dimethylsilanediylbis(2-methylindenyl)zirconium dichloride,
dimethylsilanediylbis(2-methylbenzindenyl)zirconium dichloride
dimethylsilanediylbis(2-ethylbenzindenyl)zirconium dichloride,
methylphenylsilanediylbis(2-ethylbenzindenyl)zirconium dichloride,
methylphenylsilanediylbis(2-methylbenzindenyl)zirconium dichloride,
diphenylsilanediylbis(2-methylbenzindenyl)zirconium dichloride,
diphenylsilanediylbis(2-ethylbenzindenyl)zirconium dichloride, and
dimethylsilanediylbis(2-methylindenyl)hafnium dichloride and the corresponding dimethylzirconium compounds.

Particularly suitable compounds of the general formula IVd are those in which

M is titanium or zirconium,

X is chlorine, $C_1$–$C_4$-alkyl or phenyl, $R^{19}$ is

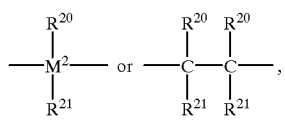

A is

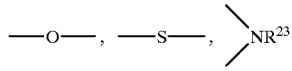

and $R^5$ to $R^7$ and $R^9$ are each hydrogen, $C_1$–$C_{10}$-alkyl, $C_3$–$C_{10}$-cycloalkyl, $C_6$–$C_{15}$-aryl or $Si(R^{12})_3$, or where two adjacent radicals form a cyclic group of 4 to 12 carbon atoms.

The synthesis of such complex compounds can be carried out by methods known per se, the reaction of appropriately substituted, cyclic hydrocarbon anions with halides of titanium, zirconium, hafnium, vanadium, niobium or tantalum being preferred.

Examples of appropriate preparation processes are described, inter alia, in J. Organometal. Chem., 369(1989), 359–370.

Mixtures of different metallocene complexes may also be used.

The catalyst system used in the novel process contains, as component C), a compound forming metallocenium ions.

Suitable compounds forming metallocenium ions are strong, neutral Lewis acids, ionic compounds having Lewis acid cations and ionic compounds having Brönsted acids as cations.

Preferred strong, neutral Lewis acids are compounds of the general formula V $$M^3X^1X^2X^3 \qquad \qquad V$$

where $M^3$ is an element of main group III of the Periodic Table, in particular B, Al or Ga, preferably B, $X^1$, $X^2$ and $X^3$ are each hydrogen, $C_1$–$C_{10}$-alkyl, $C_6$–$C_{15}$-aryl, alkylaryl, arylalkyl, haloalkyl or haloaryl, each having 1 to 10 carbon atoms in the alkyl radical and 6 to 20 carbon atoms in the aryl radical, or fluorine, chlorine, bromine or iodine, in particular haloaryl, preferably pentafluorophenyl.

Particularly preferred compounds of the general formula V are those in which $X^1$, $X^2$ and $X^3$ are identical, tris(pentafluorophenyl)borane being preferred.

Suitable ionic compounds having Lewis acid cations are compounds 20 of the general formula VI

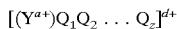

where

Y is an element of main groups I to VI or of sub-groups I to VIII of the Periodic Table, $Q_1$ to $Q_z$ are radicals having a single negative charge, such as $C_1$–$C_{28}$-alkyl, $C_6$–$C_{15}$-aryl, alkylaryl, arylalkyl, haloalkyl, haloaryl, each having 6 to 20 carbon atoms in the aryl radical and 1 to 28 carbon atoms in the alkyl radical, $C_1$–$C_{10}$-cycloalkyl, which may be substituted by $C_1$–$C_{10}$-alkyl, or halogen, $C_1$–$C_{28}$-alkoxy, $C_6$–$C_{15}$-aryloxy, silyl or mercaptyl, a is an integer from 1 to 6, z is an integer from 0 to 5 and d is the difference a–z, where d is greater than or equal to 1.

Carbonium cations, oxonium cations and sulfonium cations and cationic transition metal complexes are particularly preferred. Particular examples are the triphenylmethyl cation, the silver cation and the 1,1'-dimethylferrocenyl cation. They preferably have noncoordinating opposite ions, in particular boron compounds, as also mentioned in WO 91/09882, preferably tetrakis(pentafluorophenyl)borate.

Ionic compounds having Brönsted acids as cations and preferably also noncoordinating opposite ions are mentioned in WO 91/09882, a preferred cation being N,N-dimethylanilinium.

The amount of compounds forming metallocenium ions is preferably from 0.1 to 10 equivalents, based on the metallocene complex IV.

Particularly suitable compounds C) forming metallocenium ions are open-chain or cyclic alumoxane compounds of the general formula II or III

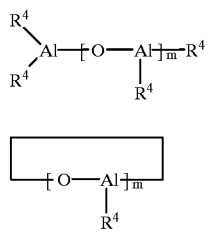

where $R^4$ is $C_1$–$C_4$-alkyl, preferably methyl or ethyl and m is an integer from 5 to 30, preferably from 10 to 25.

The preparation of these oligomeric alumoxane compounds is usually carried out by reacting a solution of trialkylaluminum with water and is described, inter alia, in EP-A 284 708 and U.S. Pat. No. 4,794,096.

As a rule, the oligomeric alumoxane compounds obtained are in the form of mixtures of both linear and cyclic chain molecules of different lengths, so that m is to be regarded as an average value. The alumoxane compounds may also be present as a mixture with other metal alkyls, preferably with alkylaluminums.

Preferably, both the metallocene complexes (component B) and the compounds forming metallocenium ions (component C) are used in solution, aromatic hydrocarbons of 6 to 20 carbon atoms, in particular xylene and toluene, being particularly preferred.

Aryloxyalumoxanes, as described in U.S. Pat. No. 5,391,793, aminoaluminoxanes, as described in U.S. Pat. No. 5,371,260, aminoaluminoxane hydrochlorides, as described in EP-A 633 264, silyloxyalumoxanes, as described in EP-A 621 279 or mixtures thereof may furthermore be used as component C).

It has proven advantageous to use the metallocene complexes and the oligomeric alumoxane compound in amounts such that the atomic ratio of aluminum from the oligomeric alumoxane compound to the transition metal from the metallocene complexes is from 10:1 to $10^6$:1, in particular from 10:1 to $10^4$:1.

The catalyst system used in the novel process may furthermore contain, as component D), a metal compound of the general formula I

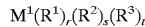

where $M^1$ is an alkali metal, an alkaline earth metal or a metal of main group III of the Periodic Table, i.e. boron, aluminum, gallium, indium or thallium, $R^1$ is hydrogen, $C_1$–$C_{10}$-alkyl, $C_6$–$C_{15}$-aryl, alkylaryl or arylalkyl, each having 1 to 10 carbon atoms in the alkyl radical and 6 to 20 carbon atoms in the aryl radical, $R^2$ and $R^3$ are each hydrogen, halogen, $C_1$–$C_{10}$-alkyl, $C_6$–$C_{15}$-aryl, alkylaryl, arylalkyl or alkoxy, each having 1 to 10 carbon atoms in the alkyl radical and 6 to 20 carbon atoms in the aryl radical, r is an integer from 1 to 3 and s and t are integers from 0 to 2, the sum r+s+t corresponding to the valency of $M^1$.

Preferred metal compounds of the general formula I are those in which $M^1$ is lithium, magnesium or aluminum and $R^1$ to $R^3$ are each $C_1$–$C_{10}$-alkyl.

Particularly preferred metal compounds of the formula I are n-butyllithium, n-butyl-n-octylmagnesium, n-butyl-n-heptylmagnesium, tri-n-hexylaluminum, tri-isobutylaluminum, triethylaluminum and trimethylaluminum.

If component D) is used, it is preferably present in the catalyst system in an amount of from 800:1 to 1.1, in particular from 500:1 to 50:1(molar ratio of $M^1$ from I to transition metal M from IV).

An antistatic agent is furthermore used in the novel process. In general, all antistatic agents which are suitable for polymerizations may be used. Examples are salt mixtures comprising calcium salts of medialanic acid and chromium salts of N-stearylanthranilic acid, as described in DE-A 3543360. Other suitable antistatic agents are $C_{12}$–$C_{22}$-fatty acid soaps of alkali metals or alkaline earth metals, salts of sulfonic esters of the general formula (RR')-CHOSO$_3$Me, esters of polyethylene glycols with fatty acids, polyoxyethylene alkyl ethers, etc. An overview of antistatic agents is also given in EP-A 107 127.

A mixture of a metal salt of medialanic acid, a metal salt of anthranilic acid and a polyamine may furthermore be used as an antistatic agent, as described in EP-A 636 636.

Commercially available products, such as Stadis® 450 from Du Pont, a mixture of toluene, isopropanol, dodecylbenzenesulfonic acid, a polyamine, a copolymer of dec-1-en and $SO_2$, and dec-1-en or ASA-3 from Shell, may also be used.

The antistatic agent is preferably used as a solution; in the particularly preferred case of Stadis® 450, preferably from 1 to 50, or particularly preferably from 5 to 25, % by weight of this solution, based on the mass of the support catalyst used (carrier, metallocene complex and compound forming metallocenium ions), is used. The required amounts of antistatic agent may however vary within wide ranges depending on the type of antistatic agent used.

In the novel process, a possible procedure comprises first carrying out a prepolymerization in suspension, suitable suspending agents being alkane, preferably heptane or isodecane, or in the liquid monomer, in the presence of the antistatic agent.

In a preferred procedure, the carrier, preferably an inorganic carrier, is suspended in a suspending agent, preferably toluene, a solution of the compound forming metallocenium ions is added at from 0 to 80° C. over a period from 5 to 240 minutes, stirring is then carried out for from 0.5 to 48 hours at from 0 to 80° C. and the product is filtered off, washed and dried. For this purpose, a solution of the metallocene complex in a methylalumoxane solution is then preferably added and mixing is carried out at from 0 to 80° C. over a period of from 5 to 360 minutes. The solvent is then removed and the resulting support catalyst is dried.

The actual polymerization is then preferably carried out in liquid monomers (bulk) or in the gas phase, preferably in the stirred gas phase. These processes are known per se.

In a preferred procedure, the metal compound D) is initially taken, preferably in a solvent, such as heptane, the liquid alk-1-ene is added and the supported catalyst is added while stirring at from 0 to 100° C. The polymerization time may be from 0.01 to 24, preferably from 0.1 to 5, hours. If it is desired to prepare copolymers, the further monomer or monomers are preferably added during the actual polymerization, preferably continuously.

The novel process is distinguished by the fact that it can be carried out on an industrial scale, no coatings occur, no agglomerates form, the productivity of the catalyst systems used has been increased and the polymers prepared by the novel process have a narrow molecular weight distribution and good morphology. Furthermore, it was possible to obtain polymers having a lower melting point.

EXAMPLES

Example A
Preparation of the supported metallocene catalyst
a) Silica gel laden with methylalumoxane (MAO)

1000 g of silica gel (SG 332, pore diameter 50 µm, from Grace; heated for 8 hours at 180° C. under reduced pressure (1 mbar)) were suspended in 5 l of toluene under an $N_2$ atmosphere. At 18° C., 7.75 l (6.38 kg) of 1.53 molar methylaluminoxane solution (in toluene, from Witco) were added in the course of 120 minutes. Thereafter, stirring was carried out for a further 7 hours at RT (room temperature), filtration was effected and the filter cake was washed with twice 2.5 l of toluene. Drying was then carried out under reduced pressure.
b) Loading with metallocene complex 1 kg of the MAO-laden silica gel prepared under a) was initially taken in an evacuated vessel. A solution of 5.8 g (10 mmol) of rac-dimethylsilylenebis(2-methylbenzindenyl) zirconium dichloride in 1.32 l of 1.53 molar MAO solution (in toluene, from Witco) was then added while stirring. After pressure compensation with $N_2$, thorough mixing was carried out for 30 minutes at RT (room temperature). Initially at 20° C., the main amount of solvent was then distilled off under reduced pressure (until no further solvent passed over). The temperature was then increased to 55° C. in 5° C. steps and the catalyst was dried until it remained behind as an orange, free-flowing powder.

Example 1
Comparative Example:

PP-homopolymerization without antistatic agent (bulk) 2.5 mmol of triisobutylaluminum (TIBA; 1.25 ml of a 2 molar solution in heptane) were initially taken in a dry 1 l autoclave flushed with $N_2$. After the addition of 500 ml of liquid propene, 189 mg of supported catalyst were injected with $N_2$ via a lock while stirring at RT and the autoclave was heated to 60° C. After a reaction time of 60 minutes, the polymerization was stopped by discharging the remaining propene, and the product was discharged via a valve in the base. 190 g of polymer granules containing about 2% of coarse fractions having a diameter >5 mm were obtained. The autoclave was then opened. A slight polymer coating was present on the wall and stirrer. Productivity: 1005 g of PP (polypropylene)/g of supported catalyst.

Example 2

PP homopolymerization with antistatic agent (bulk) Example 1 was repeated with 192 mg of supported catalyst, except that 10 mg of solution of a commercial antistatic agent (Stadise® 450, Du Pont) were added to the initially taken alkylaluminum before the addition of the liquid propene. 216 g of polymer granules without coarse fractions were obtained (productivity: 1125 g of PP/g of supported catalyst). The autoclave wall and stirrer were free of coatings.

Data on Stadis® 450.
from 50 to 65% by weight of toluene
from 1 to 5% by weight of isopropanol
from 1 to 10% by weight of dodecylbenzenesulfonic acid polymeric reaction product of N-alkyl-1,3-diaminopropane and epichlorohydrin (molar ratio 1:1.5)
alternating copolymer of dec-1-en and $SO_2$
dec-1-en

Example 3

PP homopolymerization with antistatic agent (bulk) Example 2 was repeated with 200 mg of supported catalyst and 20 mg of Stadis solution. 258 g of polymer granules without coarse fractions were obtained (productivity: 1290 g of PP/g of supported catalyst). The autoclave wall and stirrer were free of coatings.

Example 4

PP homopolymerization with antistatic agent (gas phase) Example 3 was repeated with 194 mg of supported catalyst, except that only 150 ml of liquid propene were initially taken so that, after heating up, polymerization was carried out in the gas phase. Here, the pressure was kept constant at 24 bar. 194 g of polymer granules without coarse fractions were obtained (productivity: 1000 g of PP/g of supported catalyst). The autoclave wall and stirrer were free of coatings.

Example 5

Comparative Example:

PP homopolymerization without antistatic agent (bulk) Example 1 was repeated with 1005 mg of supported catalyst in a 10 l autoclave (20 mmol of TIBA; 3000 g of liquid propene), but polymerization was carried out for 90 minutes. 1050 g of polymer granules containing 5% by weight of coarse fraction were obtained (productivity: 1044 g of PP (polypropylene)/g of supported catalyst). The autoclave wall and the stirrer had polymer coatings and fused material.

Example 6

PP homopolymerization with antistatic agent (bulk) Example 5 was repeated with 1024 mg of supported catalyst and 100 mg of antistatic solution. 2030 g of polymer granules without a coarse fraction were obtained (melting point $T_m$:142.1° C., number average molecular weight $M_n$: 119,000 g/mol, weight average molecular eight $M_w$: 242,000; productivity: 1982 g of PP/g of supported catalyst). The autoclave wall and the stirrer were free of coatings.

The number average molecular weights $M_n$ and weight average molecular weights $M_w$ were determined by means of gel permeation chromatography.

Example 7

PP homopolymerization with antistatic agent (bulk) Example 5 was repeated with 1080 mg of supported catalyst, 150 mg of antistatic solution and 30 mmol of TIBA. 1690 g of polymer granules without a coarse fraction were obtained ($T_m$:141.0° C., $M_n$:127,000 g/mol, $M_w$:263,000; productivity: 1594 g of PP/g of supported catalyst). The autoclave wall and the stirrer were free of coatings.

Example 8

Comparative Example:

PP homopolymerization without antistatic agent (gas phase) Example 5 was repeated with 1030 mg of supported catalyst, but only 1500 g of liquid propene were initially taken. On heating up, the polymerization went over into the gas phase and the pressure was kept constant at 24 bar. After 30 minutes, the polymerization had to be stopped since the stirrer was partially blocked by lumps. 290 g of polymer granules and in addition 50 g of fused product were obtained (productivity: 330 g of PP/g of supported catalyst). The autoclave wall and stirrer had pronounced coatings and fused material.

Example 9

PP homopolymerization with antistatic agent (gas phase) Example 6 was repeated with 1083 mg of supported catalyst, 30 mmol of TIBA and 150 mg of antistatic solution, but only 1500 g of liquid propene were initially taken. On heating up, the polymerization went over into the gas phase and the pressure was kept constant at 24 bar. 1430 g of polymer granules without coarse fractions were obtained (productivity: 1320 g of PP/g of supported catalyst). The autoclave wall and stirrer were free of coatings.

Example 10

Ethene/propene copolymerization with antistatic agent (bulk) Example 7 was repeated with 1036 mg of supported metallocene catalyst, 3500 g of liquid propene being initially taken and ethene being fed in continuously during the polymerization so that a total of 35 g of ethene had been introduced at the end of the polymerization. 2070 g of polymer granules without coarse fractions were obtained ($T_m$:137.7° C., $M_n$:133,000 g/mol, $M_w$: 262,000; productivity: 1920 g of PP/g of supported catalyst). The autoclave wall and stirrer were free of coatings.

Example 11

Ethene/propene copolymerization with antistatic agent (bulk) Example 7 was repeated with 1020 mg of supported metallocene catalyst, 3500 g of liquid propene being initially taken and ethene being fed in continuously during the polymerization so that a total of 70 g of ethene had been introduced at the end of the polymerization. 2020 g of polymer granules without coarse fractions were obtained ($T_m$:133.9° C., $M_n$:102,000 g/mol, $M_w$: 210,000; productivity: 1980 g of PP/g of supported catalyst). The autoclave wall and stirrer were free of coatings.

Example 12

Ethene/propene copolymerization with antistatic agent (bulk) Example 7 was repeated with 1033 mg of supported metallocene catalyst, 3500 g of liquid propene being initially taken and ethene being fed in continuously during the polymerization so that a total of 105 g of ethene had been introduced at the end of the polymerization. 2280 g of polymer granules without coarse fractions were obtained ($T_m$:131.5° C., $M_n$:96,000 g/mol, $M_w$: 197,000; productivity: 2207 g of PP/g of supported catalyst). The autoclave wall and stirrer were free of coatings.

Example 13

Ethene/propene copolymerization with antistatic agent (bulk) Example 7 was repeated with 994 mg of supported metallocene catalyst, 3500 g of liquid propene being initially taken and ethene being fed in continuously during the polymerization so that a total of 140 g of ethene had been introduced at the end of the polymerization. 2230 g of polymer granules without coarse fractions were obtained ($T_m$:128.9° C., $M_n$:118,000 g/mol, $M_w$: 209,000; productivity: 2243 g of PP/g of supported catalyst). The autoclave wall and stirrer were free of coatings.

Example 14

Ethene/propene copolymerization with antistatic agent (bulk) Example 7 was repeated with 973 mg of supported metallocene catalyst, 3500 g of liquid propene being initially taken and ethene being fed in continuously during the polymerization so that a total of 175 g of ethene had been introduced at the end of the polymerization. 2180 g of polymer granules without coarse fractions were obtained ($T_m$: 122.9° C., $M_n$: 123,000 g/mol, $M_w$: 192,000; productivity: 2240 g of PP/g of supported catalyst). The autoclave wall and stirrer were free of coatings.

Example 15

Ethene/propene copolymerization with antistatic agent (gas phase) Example 13 was repeated with 1016 mg of supported metallocene catalyst, but only 1500 g of liquid propene were initially taken so that, after heating up, the polymerization was continued in the gas phase. 2023 g of polymer granules without coarse fractions were obtained ($T_m$: 127.1° C.; productivity: 1991 g of PP/g of supported catalyst). The autoclave wall and stirrer were free of coatings.

Example 16

Comparative Example:

Ethene/propene copolymerization without antistatic agent (bulk) Example 10 was repeated with 1041 mg of supported metallocene catalyst but without antistatic agent. After a polymerization time of 45 minutes, the polymerization had to be stopped since the stirrer was blocked by lumps and fused material (18 g of 35 ethene had been metered in at this time). 532 g of polymer granules and about 200 g of highly fused polymer lumps (diameter 1–7 cm) were obtained. Further product was fused to stirrer blade and autoclave wall.

We claim:

1. A process for the preparation of polymers of $C_2$–$C_{12}$-alk-1-enes by the polymerization of alk-1-enes which comprise from 50 to 100 mol % of propene, from 0 to 50 mol % of ethylene and from 0 to 20 mol % of $C_4$–$C_{12}$-alk-1-enes, at from −50 to 300° C. and from 0.5 to 3000 bar in the presence of a catalyst system which contains A) an inorganic or organic carrier, B) a metallocene complex of the general formula IVc

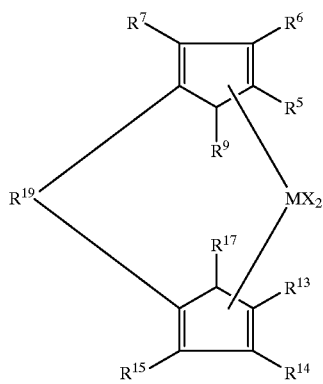

IVc where

M is titanium, zirconium, hafnium, vanadium, niobium or tantalum,

X is fluorine, chlorine, bromine, iodine, hydrogen, $C_1$–$C_{10}$-alkyl, $C_6$–$C_{15}$-aryl, alkylaryl having 1 to 10 carbon atoms in the alkyl radical and 6 to 20 carbon atoms in the aryl radical, —OR$^{10}$ or —NR$^{10}$R$^{11}$, R$^{10}$ and R$^{11}$ are each $C_1$–$C_{10}$-alkyl, $C_6$–$C_{15}$-aryl, alkylaryl, arylalkyl, fluoroalkyl or fluoroaryl, each having 1 to 10 carbon atoms in the alkyl radical and 6 to 20 carbon atoms in the aryl radical, R$^5$ to R$^7$, R$^9$, R$^{13}$ to R$^{15}$ and R$^{17}$ are each hydrogen, $C_1$–$C_{10}$-alkyl, 5- to 7-membered cycloalkyl, which in turn may carry $C_1$–$C_{10}$-alkyl as substituent, $C_6$–$C_{15}$-aryl or arylalkyl, where two adjacent radicals together may furthermore form a saturated or unsaturated cyclic group of 4 to 15 carbon atoms or Si(R$^{12}$)$_3$, R$^{12}$ is $C_1$–$C_{10}$-alkyl, $C_3$–$C_{10}$-cycloalkyl or $C_6$–$C_{15}$-aryl, R$^{19}$ is

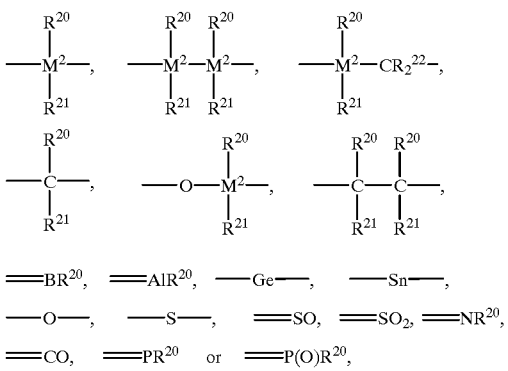

where

R$^{20}$, R$^{21}$ and R$^{22}$ are identical or different and are each hydrogen, halogen, $C_1$–$C_{10}$-alkyl, $C_1$–$C_{10}$-fluoroalkyl, $C_6$–$C_{10}$-fluoroalkyl, $C_6$–$C_{10}$-aryl, $C_1$–$C_{10}$-alkoxy, $C_2$–$C_{10}$-alkenyl, $C_4$–$C_{70}$-arylalkyl, $C_8$–$C_{40}$-arylalkenyl or $C_7$–$C_{40}$-alkylaryl, or two adjacent radicals together with the atoms linking them form a ring, M$^2$ is silicon, germanium or tin, C) a compound forming metallocenium ions and D) optionally a metal compound of the formula I $$M^1(R^1)_r(R^2)_s(R^3)_t$$ I where M$^1$ is an alkali metal, an alkaline earth metal or a metal of main group III of the Periodic Table R$^1$ is hydrogen, $C_1$–$C_{10}$-alkyl, $C_6$–$C_{15}$-aryl, alkylaryl or arylalkyl, each having 1 to 10 carbon atoms in the alkyl radical and 6 to 20 carbon atoms in the aryl radical, R$^2$ and R$^3$ are each hydrogen, halogen, $C_1$–$C_{10}$-alkyl, $C_6$–$C_{15}$-aryl, alkylaryl, arylalkyl or alkoxy, each having 1 to 10 carbon atoms in the alkyl radical and 6 to 20 carbon atoms in the aryl radical, r is an integer from 1 to 3 and s and t are integers from 0 to 2, the sum r+s+t corresponding to the valency of M$^1$, and wherein an antistatic agent is added during polymerization.

2. A process as defined in claim 1, wherein the polymerization is carried out in liquid monomers or in the gas phase.

3. A process as defined in claim 1, wherein the polymerization is carried out in the stirred gas phase.

4. A process as defined in claim 1, wherein initially, in the presence of the antistatic agent, a prepolymerization is carried out in suspension or in the liquid monomer.

5. A process as defined in claim 1, wherein an open-chain or cyclic alumoxane compound of the formula II or III

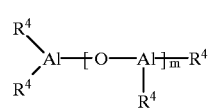

II

-continued
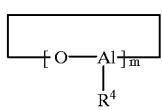
III
where $R^4$ is $C_1$–$C_4$-alkyl and m is an integer from 5 to 30,
is used as the compound C) forming metallocenium ions.
6. A process as defined in claim 1, wherein the alk-1-enes used comprise
from 50 to 100 mol % of propene,
from 0 to 30 mol % of ethylene and
from 0 to 20 mol % of $C_4$–$C_{12}$-alk-1-enes.
* * * * *